United States Patent
Morito et al.

(10) Patent No.: US 11,754,421 B2
(45) Date of Patent: Sep. 12, 2023

(54) RESOLVER SIGNAL PROCESSING DEVICE, DRIVE APPARATUS, RESOLVER SIGNAL PROCESSING METHOD, AND PROGRAM

(71) Applicant: TOSHIBA MITSUBISHI-ELECTRIC INDUSTRIAL SYSTEMS CORPORATION, Chuo-ku (JP)

(72) Inventors: Chikara Morito, Tokyo (JP); Hajime Shiraishi, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 267 days.

(21) Appl. No.: 17/257,050

(22) PCT Filed: Mar. 1, 2019

(86) PCT No.: PCT/JP2019/008115
§ 371 (c)(1),
(2) Date: Dec. 30, 2020

(87) PCT Pub. No.: WO2020/178904
PCT Pub. Date: Sep. 10, 2020

(65) Prior Publication Data
US 2021/0270638 A1 Sep. 2, 2021

(51) Int. Cl.
*G01D 5/244* (2006.01)
*H02P 21/18* (2016.01)
*G01D 1/04* (2006.01)

(52) U.S. Cl.
CPC ............... *G01D 5/244* (2013.01); *G01D 1/04* (2013.01); *H02P 21/18* (2016.02)

(58) Field of Classification Search
CPC ............ G01D 1/04; H02P 21/18; H03M 1/48; H03M 1/485; H03M 1/645
See application file for complete search history.

(56) References Cited

U.S. PATENT DOCUMENTS

| | | | |
|---|---|---|---|
| 2010/0007294 A1* | 1/2010 | Hasegawa | H02P 6/17 318/400.04 |
| 2011/0090104 A1* | 4/2011 | Sata | H03M 1/485 341/116 |
| 2018/0339724 A1* | 11/2018 | Nishikawa | B62D 5/0493 |

FOREIGN PATENT DOCUMENTS

| | | | |
|---|---|---|---|
| EP | 985908 A2 * | 3/2000 | G01P 3/489 |
| JP | 2013-117462 A | 6/2013 | |

(Continued)

OTHER PUBLICATIONS

M.G. Tiapkin, High Resolution Processing of Position Sensor with Amplitude Modulated Signals of Servo Drive, 2017, IEEE,1042-1047 (Year: 2017).*

(Continued)

*Primary Examiner* — Bickey Dhakal
(74) *Attorney, Agent, or Firm* — Oblon, McClelland, Maier & Neustadt, L.L.P.

(57) ABSTRACT

A resolver signal processing device includes a deviation calculation unit, a PI operation unit, and an integration operation unit. The deviation calculation unit calculates a deviation between a first product obtained by multiplying a signal of phase A by a cosine value based on a reference phase θref and a second product obtained by multiplying a signal of phase B by a sine value based on the reference phase θref. The PI operation unit carries out a proportional integration operation which includes a first integration operation and is defined to converge the deviation on zero on the basis of the deviation. The integration operation unit carries out a second integration operation of integrating a value generated from a result of the proportional integration operation and outputs a result of the second integration operation as phase information of the resolver.

10 Claims, 5 Drawing Sheets

(56) References Cited

FOREIGN PATENT DOCUMENTS

| | | |
|---|---|---|
| JP | 2016-90244 A | 5/2016 |
| JP | 2018-109596 A | 7/2018 |
| JP | 2018-205166 A | 12/2018 |

OTHER PUBLICATIONS

International Search Report dated Apr. 23, 2019 in PCT/JP2019/008115 filed on Mar. 1, 2019, 2 pages.

* cited by examiner

2-PHASE EXCITATION SIGNAL

OUTPUT SIGNAL

RESOLVER SIGNAL PROCESSING DEVICE, DRIVE APPARATUS, RESOLVER SIGNAL PROCESSING METHOD, AND PROGRAM

TECHNICAL FIELD

Embodiments of the present invention relate to a resolver signal processing device, a drive apparatus, a resolver signal processing method, and a program.

BACKGROUND ART

A resolver signal processing device extracts phase information of a phase detected by a resolver on the basis of an output signal of the resolver. However, it is not easy to extract phase information of a phase detected by a resolver through a simple method because there is a case in which an output signal of the resolver includes noise, and the like.

CITATION LIST

Patent Literature

[Patent Literature 1]
Japanese Unexamined Patent Application, First Publication No. 2016-90244

SUMMARY OF INVENTION

Technical Problem

An object of the present invention is to provide a resolver signal processing device which extracts phase information of a resolver from an output signal of the resolver through a simple method, a drive apparatus, a resolver signal processing method, and a program.

Solution to Problem

A resolver signal processing device of an aspect of embodiments includes a deviation calculation unit, a PI operation unit, and an integration operation unit. The deviation calculation unit calculates a deviation between a first product obtained by multiplying a signal of the phase A by a cosine value based on a reference phase θref and a second product obtained by multiplying a signal of the phase B by a sine value based on the reference phase θref. The PI operation unit carries out a proportional integration operation which includes a first integration operation and is defined to converge the deviation on zero on the basis of the deviation. The integration operation unit carries out a second integration operation of integrating a value generated from a result of the proportional integration operation and outputs a result of the second integration operation as phase information of the resolver.

DESCRIPTION OF EMBODIMENTS

Hereinafter, a resolver signal processing device, a drive apparatus, a resolver signal processing method, and a program of embodiments will be described with reference to the drawings. In the following description, components having the same or similar functions are denoted by the same sign. In addition, redundant description of such components may be omitted.

A two-phase excitation two-phase output type is exemplified as a resolver of an embodiment. A two-phase output type resolver outputs a two-phase signal, as a signal of phase A and a signal of phase B, which have been amplitude-modulated with a phase difference of about 90 degrees. For example, the aforementioned two-phase signal may have a sine wave and a cosine wave having amplitudes changing with a phase θ0. A two-phase excitation type resolver is provided with an excitation signal with phases A and B which have been amplitude-modulated with a phase difference of about 90 degrees. In addition to the two-phase excitation two-phase output type resolver, there are a one-phase excitation two-phase output type, a two-phase excitation one-phase output type, and the like.

Meanwhile, "electrically connected" may be simply represented as "connected" in the following description. When values such as speeds and phases of comparison targets are the same values or similar values, this may be simply regarded as "the same."

First Embodiment

Figure 1:
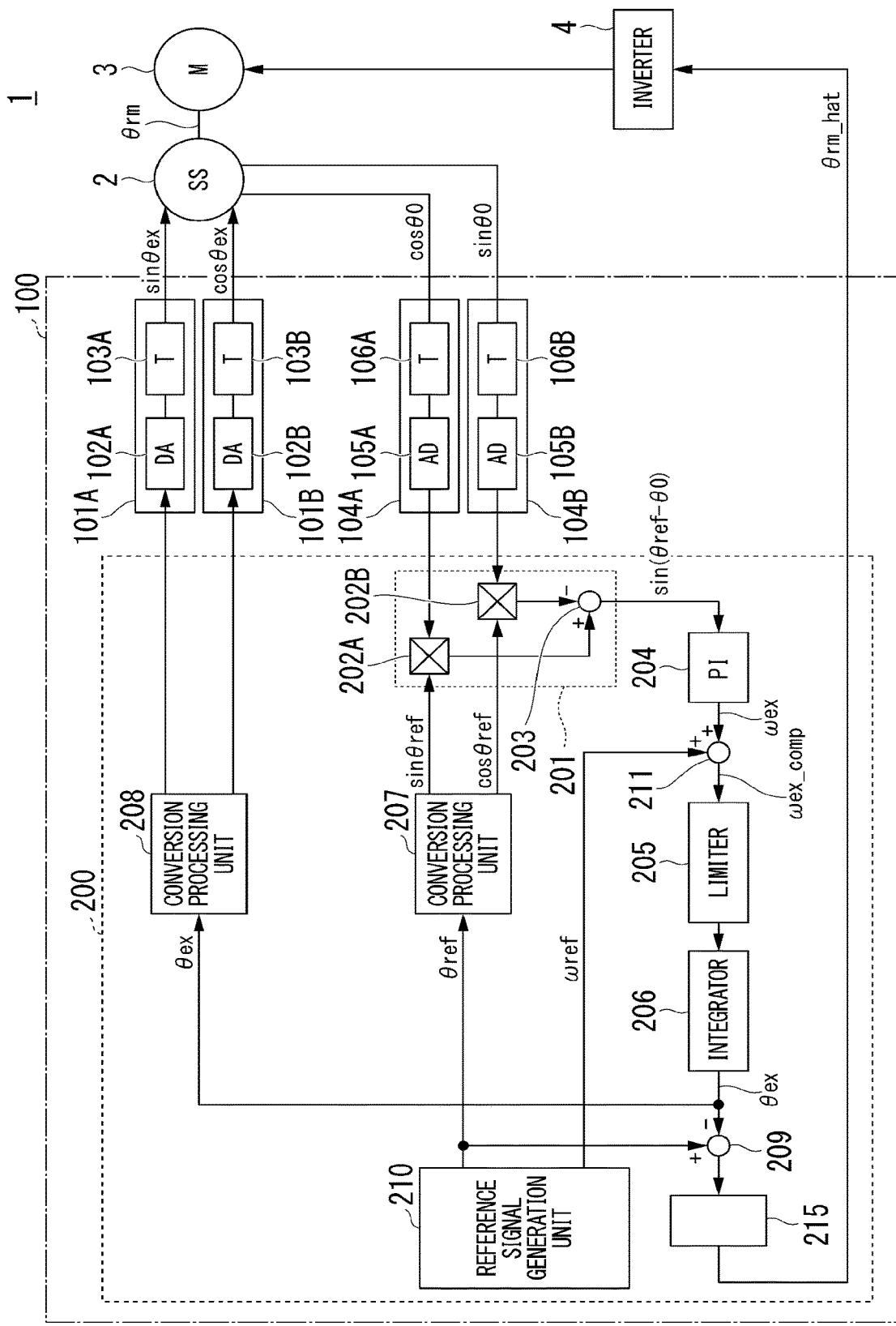
FIG. 1 is a diagram illustrating a configuration of a drive apparatus including a resolver signal processing device according to a first embodiment.

FIG. 1 is a diagram illustrating a configuration of a drive apparatus 1 including a resolver signal processing device 100 according to an embodiment.

The drive apparatus 1 includes, for example, a resolver 2 (denoted by SS in the figure), a motor 3 (denoted by M in the figure), an inverter 4, and a resolver signal processing device 100.

The shaft of the resolver 2 is connected to the output shaft of the motor 3 and rotates in a manner of being linked with rotation of the output shaft of the motor 3. For example, the motor 3 is driven by the inverter 4.

The resolver signal processing device 100 is connected to the resolver 2, supplies a two-phase excitation signal to the resolver 2 and receives a two-phase signal output from the resolver 2.

Here, the resolver 2 will be described with reference to FIG. 2A to FIG. 2C.

Figure 2A:
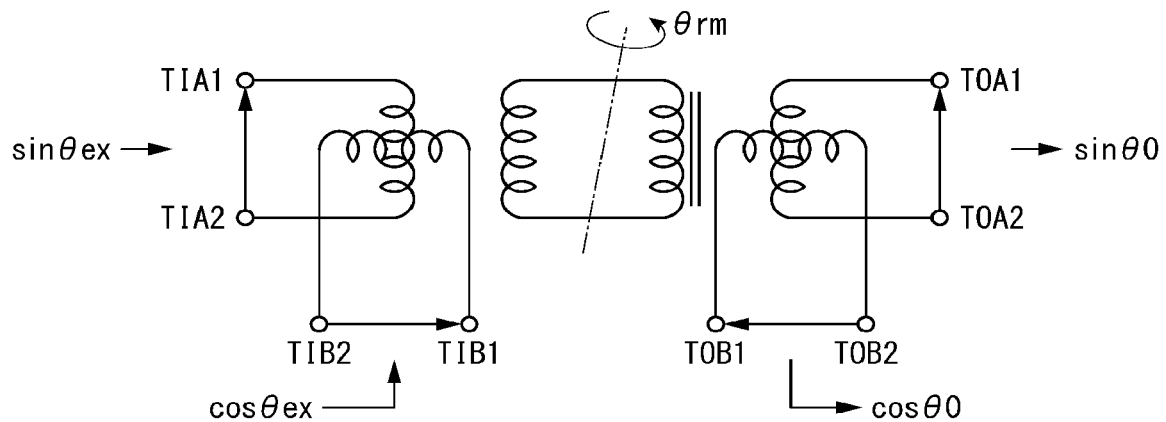
FIG. 2A is a diagram illustrating a configuration of a resolver of the embodiment.
Figure 2B:
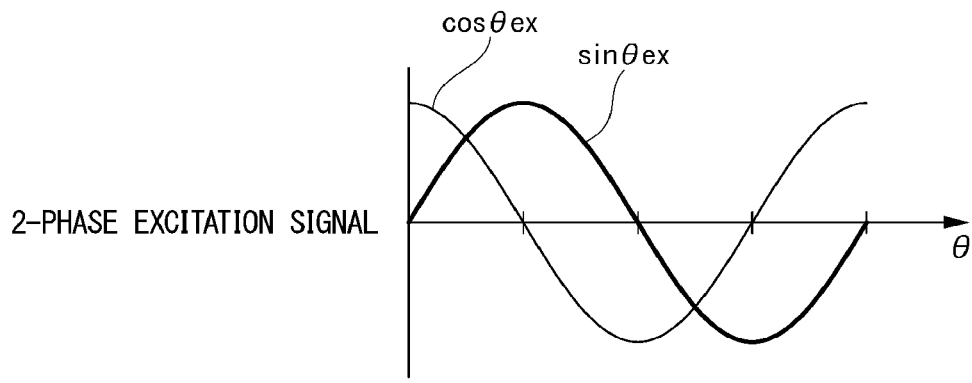
FIG. 2B is a diagram for describing a two-phase excitation signal of a resolver 2 of the embodiment.
Figure 2C:
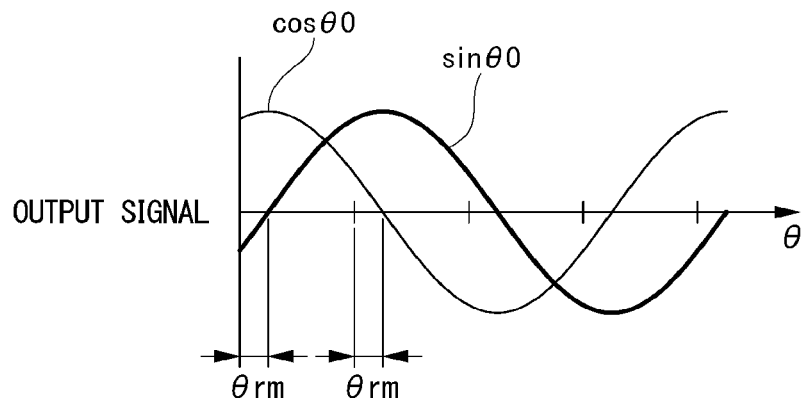
FIG. 2C is a diagram for describing a two-phase output signal of the resolver 2 of the embodiment.

FIG. 2A is a diagram illustrating a configuration of the resolver 2 of an embodiment. FIG. 2B is a diagram for describing a two-phase excitation signal of the resolver 2 of an embodiment. FIG. 2C is a diagram for describing a two-phase output signal of the resolver 2 of an embodiment.

For example, the resolver 2 is excited by a two-phase excitation signal with an excitation phase θex. The resolver 2 detects a mechanical angle phase θrm of the output shaft of the motor 3. The resolver 2 outputs the two-phase signal based on a phase θ0 related to the excitation phase θex of the two-phase excitation signal and the mechanical angle phase θrm.

A signal represented as sin θex and cos θex illustrated in the figures is an example of the two-phase excitation signal. A signal represented as sin θ0 and cos θ0 is an example of the two-phase output signal. For example, both the two-phase excitation signal and the two-phase output signal are continuous signals. The mechanical angle phase θrm, the excitation phase θex of the two-phase excitation signal and the phase θ0 have a relationship represented by expression (1).

$$\theta 0 = \theta rm + \theta ex \tag{1}$$

$$\theta ex = \int \omega ex(t) dt \tag{2}$$

The excitation phase θex in the above expression (1) is derived on the basis of an excitation angular frequency ωex(t) as represented by expression (2). The excitation angular frequency ωex(t) changes depending on a time t. The excitation phase θex is derived by integration of the excitation angular frequency ωex(t) with respect to time.

Referring back to FIG. 1, description of the resolver signal processing device 100 will be continued.

The resolver signal processing device 100 detects the phase of the resolver 2, that is, the mechanical angle phase θrm of the output shaft of the motor 3 on the basis of the two-phase signal and supplies a mechanical angle phase estimate θrm_hat that is an estimate of the mechanical angle phase θrm to the inverter 4. Hereinafter, the phase of the resolver 2 and an estimate thereof will be simply referred to as the mechanical angle phase θrm and the mechanical angle phase estimate θrm_hat.

Accordingly, the inverter 4 can drive the motor 3 according to position control based on the mechanical angle phase estimate θrm_hat by using the mechanical angle phase estimate θrm_hat as feedback information instead of the mechanical angle phase θrm.

The resolver signal processing device 100 will be described.

The resolver signal processing device 100 includes, for example, output buffer circuits 101A and 101B, input buffer circuits 104A and 104B, and a resolver signal processing unit 200.

Inputs of the output buffer circuits 101A and 101B are connected to the resolver signal processing unit 200. Outputs of the output buffer circuits 101A and 101B are connected to an excitation side of the resolver 2. The output buffer circuits 101A and 101B supply, to the resolver 2, a two-phase signal based on an excitation signal supplied from the resolver signal processing unit 200 which will be described later.

For example, the output buffer circuit 101A includes a digital-analog converter 102A which is not illustrated (hereinafter referred to as a DA converter denoted by DA in the figure) for outputting phase A, a buffer for signal amplification which is not illustrated, a transformer 103A for insulation (denoted by T in the figure), and the like. The DA converter 102A, the buffer for signal amplification and the transformer 103A are connected in this order of mention. The transformer 103A electrically insulates the resolver signal processing device 100 from the resolver 2. Description of the transformer below is omitted on the assumption that a transformation ratio of the transformer 103A is 1. Likewise, the output buffer circuit 101B also includes a digital-analog converter 102B for outputting phase B which is not illustrated, a buffer for signal amplification which is not illustrated, a transformer 103B, and the like. The DA converter 102B may be the same as the DA converter 102A. The transformer 103B may be the same as the transformer 103A. The DA converter 102B and the buffer for signal amplification and the transformer 103B are connected in this order of mention. Meanwhile, when the transformation ratio of the transformers 103A and 103B is not 1, the following description may be appropriately corrected depending on ratio values.

Inputs of the input buffer circuits 104A and 104B are connected to the output side of the resolver 2. Outputs of the input buffer circuits 104A and 104B are connected to the resolver signal processing unit 200. The input buffer circuits 104A and 104B receive a two-phase signal based on the phase θ0 from the resolver 2 and supply the two-phase signal to the resolver signal processing unit 200 which will be described later.

For example, the input buffer circuit 104A includes an analog-digital converter 105A (hereinafter referred to as an AD converter denoted by AD in the figure) for input of phase A, a buffer for signal amplification which is not illustrated, a transformer 106A (denoted by T in the figure) for insulation, and the like. The transformer 106A for insulation, the buffer for signal amplification and the AD converter 105A are connected in this order of mention. Likewise, the input buffer circuit 104B also includes an AD converter 105B for input of phase B, a buffer for signal amplification which is not illustrated, a transformer 106B, and the like. The transformer 106B for insulation, the buffer for signal amplification and the AD converter 105B are connected in this order of mention.

The AD converters 105A and 105B respectively convert analog signals with phase A and phase B output from the resolver 2 into digital values. A timing at which the AD converters 105A and 105B perform conversion is defined by a sampling command signal output from a sampling command signal generation processor which is not illustrated and is at predetermined time intervals set in advance. The AD converters 105A and 105B supply the converted digital values to the resolver signal processing unit 200.

The resolver signal processing unit 200 converts the two-phase signal supplied as digital values into phase information corresponding to the phase of the resolver 2 and supplies the phase information to the inverter 4 through the output buffer circuits 101A and 101B.

The inverter 4 includes a semiconductor switching element and an inverter controller which are not illustrated. The inverter 4 receives a supply of the mechanical angle phase estimate θrm_hat of the motor 3 from the resolver signal processing unit 200 and drives the motor 3 according to the mechanical angle phase estimate θrm_hat.

Next, the resolver signal processing unit 200 will be described.

The resolver signal processing unit 200 includes a deviation calculation unit 201, a PI controller 204 (denoted by PI in the figure), a limiter 205, an integrator 206 (integration operation unit), conversion processing units 207 and 208, a subtractor 209, a reference signal generation processing unit 210, an adder 211, and an excitation phase estimate generation unit 215. The PI controller 204 is an example of a PI operation unit.

The deviation calculation unit 201 includes multipliers 202A and 202B and a subtractor 203.

The input of the multiplier 202A is connected to the output of the AD converter 105A and the output of the conversion processing unit 207 which will be described later. The multiplier 202A multiplies a signal component of phase A supplied from the AD converter 105A by a sine-wave signal sin θref supplied from the conversion processing unit 207 to obtain a first product. The multiplier 202A supplies the first product to a first input of the subtractor 203 connected to the output thereof.

The input of the multiplier 202B is connected to the output of the AD converter 105B and the output of the conversion processing unit 207 which will be described later. The multiplier 202B multiplies a signal component of phase B supplied from the AD converter 105B by a cosine-wave signal cos θref supplied from the conversion processing unit 207 to obtain a second product. The multiplier 202B supplies the second product to a second input of the subtractor 203 connected to the output thereof.

The subtractor 203 subtracts the value of the second product calculated by the multiplier 202B from the value of the first product calculated by the multiplier 202A and supplies the difference to the PI controller 204. The difference calculated by the subtractor 203 is referred to as a deviation sin(θref−θ0).

The PI controller 204 carries out a first integration processing for integrating the deviation sin(θref−θ0), a gain multiplication processing for multiplying the deviation sin (θref−θ0) by a constant, and an operation processing for adding a result of the gain multiplication processing to a result of the first integration processing. This is referred to as a proportional integration operation. The value of the operation result of the PI controller 204 has the dimensions of an excitation angular frequency (or frequency) and this is called an excitation angular frequency ωex. The constant of the gain multiplication processing depends on the type of the resolver 2. This will be described later.

The adder 211 adds the excitation angular frequency ωex that is the operation result of the PI controller 204 to a reference angular frequency ωref which will be described later and outputs the result of addition. This result is referred to as an excitation angular frequency compensation value ωex_comp.

The limiter 205 limits the excitation angular frequency compensation value ωex_comp supplied from the adder 211 to a value in a desired range. For example, the limiter 205 may output the excitation angular frequency compensation value ωex_comp without limiting the same when the excitation angular frequency compensation value ωex_comp does not exceed a desired range based on a predetermined threshold value and limits the excitation angular frequency compensation value ωex_comp to a predetermined value when the excitation angular frequency compensation value ωex_comp exceeds the desired range. Meanwhile, a case in which the excitation angular frequency compensation value ωex_comp does not exceed a desired range based on a predetermined threshold value is an example of a case in which the excitation angular frequency compensation value ωex_comp based on the operation result of the PI controller 204 satisfies a predetermined condition.

The integrator 206 carries out, for example, a second integration processing for integrating the excitation angular frequency compensation value ωex_comp. However, when the excitation angular frequency compensation value ωex_comp has been limited by the limiter 205, the integrator 206 integrates the limited value instead of the excitation angular frequency compensation value ωex_comp. The operation result of the integrator 206 is referred to as an excitation phase θex.

The subtractor 209 subtracts the value of the excitation phase θex which is the operation result of the integrator 206 from the value of the reference phase θref supplied from the reference signal generation processing unit 210.

The excitation phase estimate generation unit 215 generates an excitation phase estimate θrm_hat on the basis of the operation result of the subtractor 209.

The reference signal generation unit 210 generates the reference angular frequency ωref and the reference phase θref on the basis of a reference frequency fref. The reference signal generation unit 210 may generate the reference phase θref by integrating the reference angular frequency ωref.

The conversion processing unit 207 converts the aforementioned reference phase θref into a cosine-wave signal cos θref and a sine-wave signal sin θref. The sine-wave signal sin θref is supplied to the multiplier 202A of the deviation calculation unit 201. The cosine-wave signal cos θref is supplied to the multiplier 202B of the deviation calculation unit 201.

The conversion processing unit 208 converts the aforementioned excitation phase θex into a cosine-wave signal cos θex and a sine-wave signal sin θex. The sine-wave signal sin θex is supplied to the input of the output buffer circuit 101A. The cosine-wave signal cos θex is supplied to the input of the output buffer circuit 101B.

As described above, the resolver signal processing unit 200 and the resolver 2 form a tracking loop. The resolver signal processing unit 200 calculates the excitation phase θex from the signal with phases A and B supplied from the resolver 2 according to the operation of the tracking loop.

The aforementioned tracking loop operates such that the reference phase θref becomes the same as a phase θ0 (=θrm+θex) included in a resolver output. The difference (θref−θ0) between the reference phase θref and the phase θ0 included in the resolver output has a value close to 0 according to PI control based on the tracking loop. Accordingly, the deviation sin(θref−θ0) can be approximated to (θref−θ0). (θref−θ0) is represented as Δθ.

As described above, the limiter 205 limits the excitation angular frequency compensation value ωex_comp to a desired range and thus the tracking loop operates according to limiting conditions of the limiter 205. Accordingly, the excitation phase θex can be prevented from changing rapidly.

In the aforementioned case, the resolver signal processing device 100 can be applied to resolvers 2 having different bands of the excitation angular frequency ωex by defining limiting values of the limiter 205 according to types of the resolvers 2. In the resolver signal processing unit 200, the limiter 205 may select and set a limiting value corresponding to the type of the resolver 2 on the basis of identification information for identifying the type of the resolver 2.

There is an axial double angle as an item indicating characteristics of the resolver 2. The axial double angle is a ratio of an electrical angle to a mechanical angle. The axial double angle of the resolver 2 is defined by the structure of the resolver 2. For example, a type outputting an output signal of N rotations when the shaft of the resolver 2 has rotated once may be called an "NX" type. N is a natural number. According to this, a type outputting an output signal of one rotation when the shaft of the resolver 2 has rotated once is a "1X" type.

A rate of change of the excitation angular frequency ωex with respect to the rotational speed of the resolver 2 is determined by the axial double angle of the resolver 2. For example, when a "1X" type resolver 2 is replaced by an "NX" type resolver, a rate of change of an excitation angular frequency (excitation angular frequency ωex_NX) with respect to the rotational speed of the "NX" type becomes N times an excitation angular frequency ωex_1X with respect to the rotational speed of the "1X" type.

When the shaft of the resolver 2 is rotating, the excitation frequency indicates a different value from that when the shaft of the resolver 2 stops. Accordingly, it is desirable to define a limiting value of the limiter 205 in consideration of the range of excitation frequencies of the transformers 103A, 103B, 106A and 106B.

Figure 3:
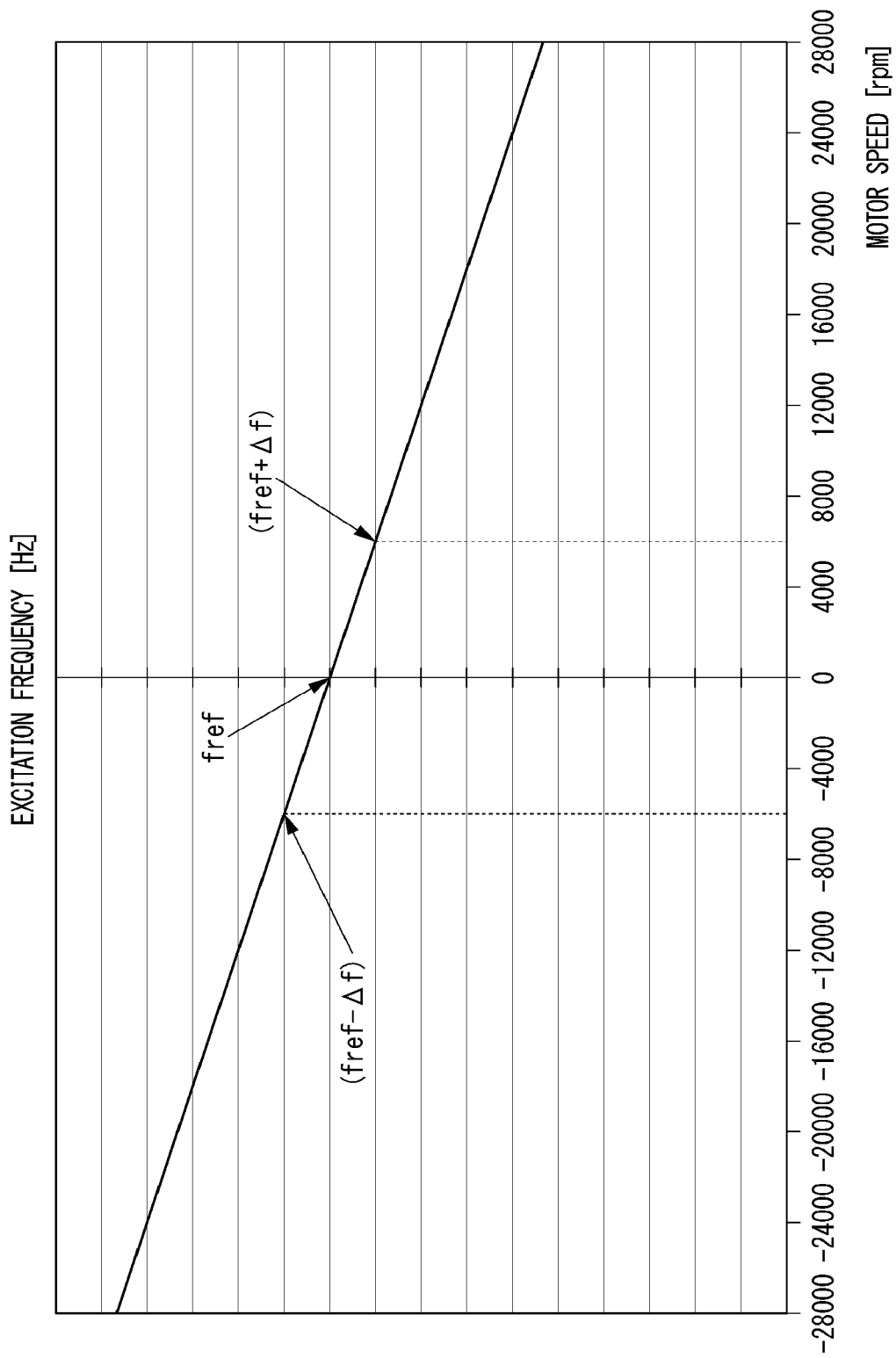
FIG. 3 is a diagram for describing a relationship among an axial double angle, an excitation frequency and a motor speed of the embodiment.
Figure 4:
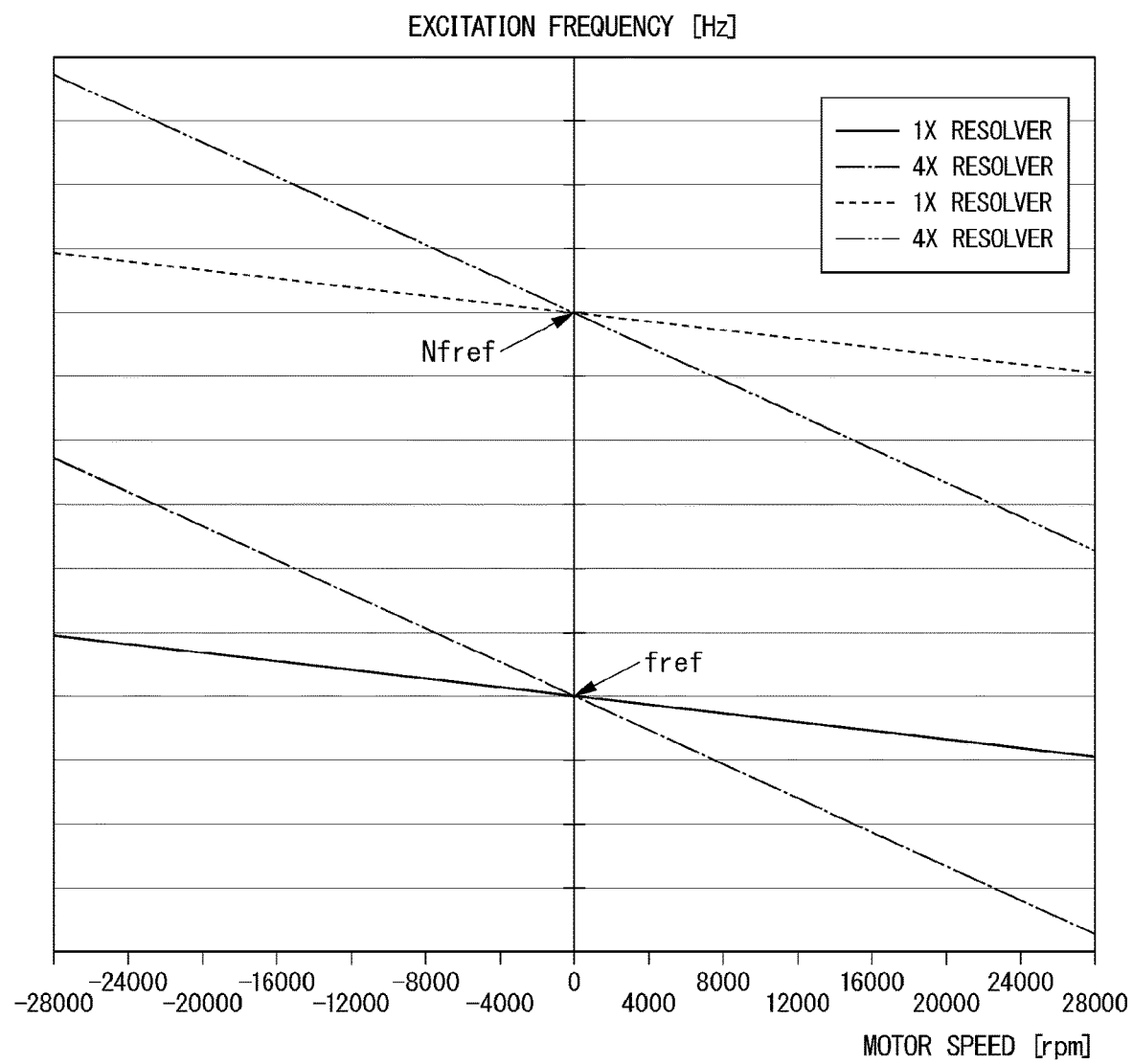
FIG. 4 is a diagram for describing a relationship among an axial double angle, an excitation frequency and a motor speed of the embodiment.

FIG. 3 and FIG. 4 are diagrams for describing a relationship among an axial double angle, an excitation frequency and a motor speed of an embodiment. The rotational speed of the motor 3 is set on the horizontal axes of the graphs shown in FIG. 3 and FIG. 4 and the excitation frequency is set on the vertical axes thereof.

The resolver 2 exemplified in FIG. 3 is, for example, of the "1X" type. For example, when the resolver 2 is excited using the reference frequency fref, the reference frequency fref and the excitation frequency become equal to each other when the motor 3 stops. When the motor 3 is rotating, the excitation frequency changes depending on the rotational frequency.

If the excitation frequency specification of each of the aforementioned transformers is (fref±Δf) (Hz), it is possible to prevent each transformer from being used in an overloaded state by controlling the excitation frequency such that it falls within the specification.

For example, an operating range read from the same graph is ±6,000 rpm defined on the basis of the reference frequency.

The resolvers 2 exemplified in FIG. 4 are of the "1X" type and the "NX" type. When they are compared to each other, the slope of the graph of the "NX" type is approximately N times the slope of the graph of the "1X" type. Different reference frequencies can be set for the respective types. In the example shown in the figure, reference frequencies are fref (Hz) and Nfref (Hz).

As described above, since excitation frequency conditions are different when axial double angles are different, it is desirable to define a limiting value of the limiter 205 such that it can be used in a frequency range suitable for each transformer.

(Verification According to Simulation)

Figure 5:
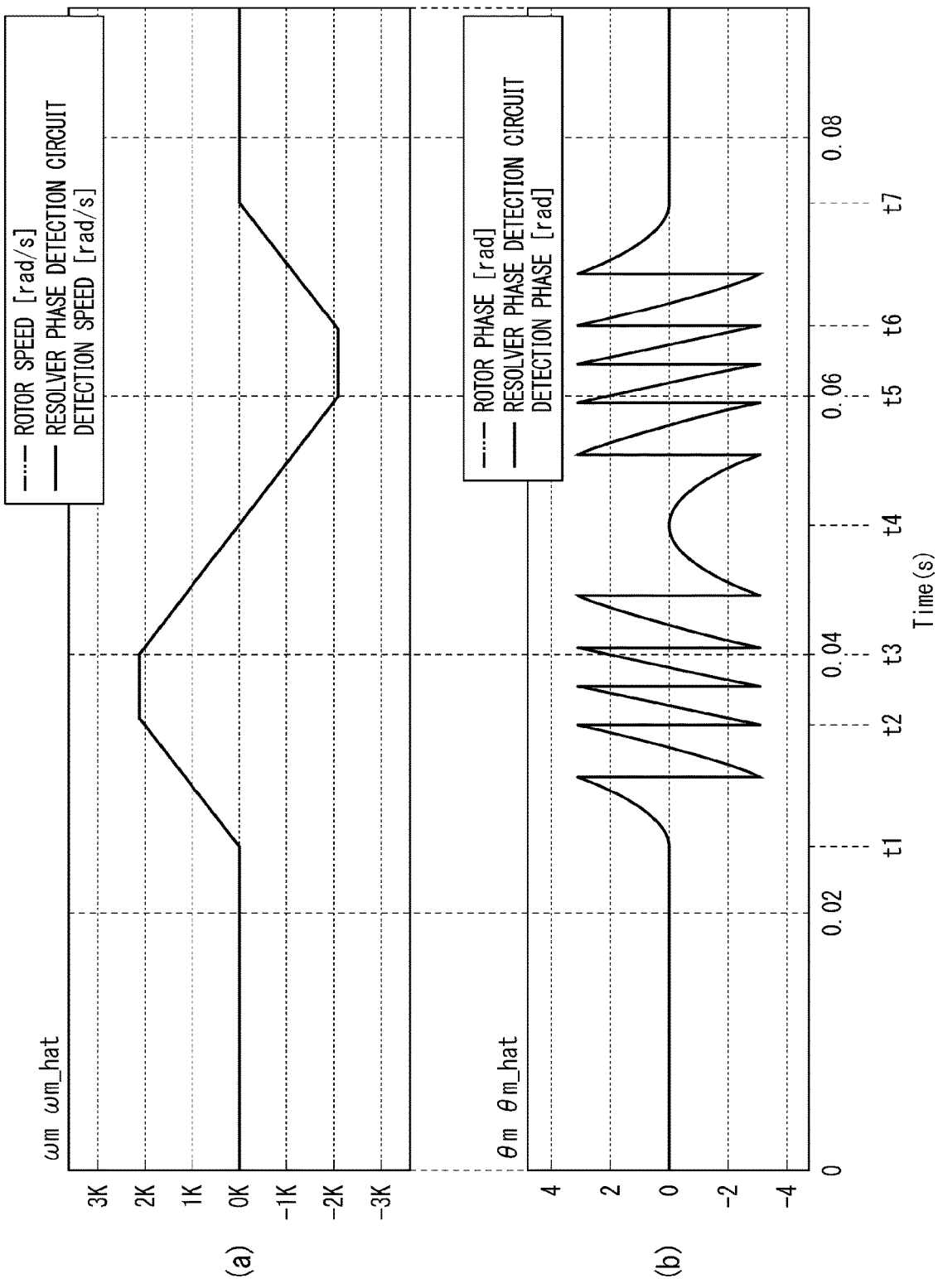
FIG. 5 is a diagram for describing results of a simulation of a resolver phase detection system of the embodiment.

FIG. 5 is a diagram for describing results of a simulation of a resolver phase detection system of an embodiment.

Simulation results shown in (a) and (b) in FIG. 5 are for verifying whether the rotor speed of the motor 3 and the phase of the resolver 2 can be detected normally when the rotor speed (rad/s) of the motor 3 swings between positive and negative sides over time.

The graph of (a) in FIG. 5 shows the rotor speed ωrm (rad/s) of the motor 3 and the excitation angular frequency ωrm_hat of the resolver 2. The graph of (b) in FIG. 5 shows the mechanical angle phase θrm (rad) of the motor 3 and the phase θrm_hat of the resolver 2.

The motor 3 is in a state in which rotation thereof is stopped until a time t1.

The rotor speed ωrm (rad/s) of the motor 3 is increased at a predetermined rate of change from the time t1 to a time t2. Consequently, the excitation angular frequency ωrm_hat of the resolver 2 increases in accordance with the rotor speed ωrm. Further, the mechanical angle phase θrm (rad) of the motor 3 and the phase θrm_hat of the resolver 2 exhibit a trend of changing in the same manner and the rotor of the motor 3 is brought into a rotating state.

The rotor speed ωrm (rad/s) of the motor 3 is fixed to a predetermined value from the time t2 to a time t3. Consequently, the excitation angular frequency ωrm_hat of the resolver 2 indicates the same fixed value as the value of the rotor speed ωrm. Further, the mechanical angle phase θrm (rad) of the motor 3 and the phase θrm_hat of the resolver 2 exhibit a trend of changing in the same manner and the rotor of the motor 3 is brought into a rotating state at a constant speed.

The rotor speed ωrm (rad/s) of the motor 3 is decreased at a predetermined rate of change from the time t3 to a time t4. Consequently, the excitation angular frequency ωrm_hat of the resolver 2 decreases in accordance with the rotor speed ωrm. Further, the mechanical angle phase θrm (rad) of the motor 3 and the phase θrm_hat of the resolver 2 exhibit a trend of changing in the same manner and the rotational speed of the rotor of the motor 3 is gradually reduced.

When the rotor speed ωrm (rad/s) of the motor 3 is decreased at a predetermined rate of change from the time t4 to a time t5 as in the range of the time t3 to the time t4, the rotor speed ωrm has a negative value and the rotor starts to rotate in a direction opposite to the rotation direction until the time t4.

From the time t5 to a time t6, the rotor speed ωrm (rad/s) of the motor 3 is fixed to a predetermined value as in the range of the time t2 to the time t3. The value at this time is a negative value different from that in the aforementioned case. Consequently, the excitation angular frequency ωrm_hat of the resolver 2 indicates a negative fixed value having the same magnitude as the rotor speed ωrm. Further, the mechanical angle phase θrm (rad) of the motor 3 and the phase θrm_hat of the resolver 2 exhibit a trend of changing in the same manner and the rotor of the motor 3 is brought into a rotating state at a constant speed.

When the rotor speed ωrm (rad/s) of the motor 3 is increased at the same rate of change as that in the range of the time t1 to the time t2 from the time t6 to a time t7, the rotor speed ωrm has a negative value but a reduction in the magnitude thereof is read. In the case of the range of the time t7 to a time t8, the mechanical angle phase θrm (rad) of the motor 3 and the phase θrm_hat of the resolver 2 exhibit a trending of having the same change as in the above case.

At the time t7, rotation of the rotor of the motor 3 stops and a detection result of the resolver 2 also represents a state in which rotation stops in the same manner. Accordingly, the phase also returns to 0 (rad) that is an initial state.

From these simulation results, it can be ascertained that the resolver signal processing unit 200 and the resolver 2 correctly detect speeds and phases.

According to at least one above-described embodiment, the resolver signal processing device 100 includes the deviation calculation unit 201, the PI controller 204 and the integrator 206. The deviation calculation unit 201 acquires a signal of amplitude-modulated phase A and a signal of phase B orthogonal to phase A as a signal output by the resolver 2 in response to an excitation signal. The deviation calculation unit 201 calculates a deviation between a first product obtained by multiplying the signal of phase A by a cosine value based on the reference phase θref and a second product obtained by multiplying the signal of phase B by a sine value based on the reference phase θref. The PI controller 204 carries out a proportional integration operation which includes a first integration operation and is defined to converge the deviation on zero. The integrator 206 carries out a second integration operation of integrating a value generated from a result of the proportional integration operation performed by the PI controller 204 and outputs a result of the second integration operation as phase information of the resolver 2. Accordingly, it is possible to extract the phase information of the resolver 2 from an output signal of the resolver 2 through a simple method.

The deviation calculation unit 201 of the resolver signal processing device 100 may acquire a signal of phase A amplitude-modulated with sin θ0 and a signal of phase B amplitude-modulated with cos θ0 as a signal output by the resolver 2 in response to the excitation signal to calculate the aforementioned deviation.

The limiter 205 provided in the tracking loop limits the excitation angular frequency ωex when the excitation angular frequency ωex has exceeded a predetermined limiting value. Accordingly, it is possible to reduce the influence on a detected value of the excitation phase θex of the resolver 2 even when a signal from the resolver 2 includes noise and detect the phase of the resolver with high practical performance without a response and stability deteriorating while preventing the resolver 2 from rotating at a higher speed than a desired rotational speed.

The inverter 4 drives the motor 3 on the basis of an estimate of a phase generated by the resolver signal processing device 100, and thus the drive apparatus 1 can increase the accuracy of position control in the motor 3.

Some or all functional units of the resolver signal processing unit 200 of the above-described embodiments may be, for example, software functional units realized by executing a program (a computer program or a software component) stored in a storage unit (a memory or the like) of a computer through a processor (a hardware processor) of a computer. Further, some or all functional units of a controller 30 may be realized by, for example, hardware such as a large scale integration (LSI) circuit, an application specific integrated circuit (ASIC) or a field-programmable gate array (FPGA), or may be realized by software functional units and hardware in combination.

Although some embodiments have been described above, configurations of the embodiments are not limited to the above examples. For example, the configurations of the embodiments may be combined and implemented.

Although several embodiments of the present invention have been described, these embodiments have been suggested as examples and are not intended to limit the scope of the invention. These embodiments can be implemented in other various forms and various omissions, substitutions and modifications are possible without departing from essential characteristics of the invention. These embodiments and modifications thereof are included in the scope and essential characteristics of the invention and also included in the invention disclosed in claims and the equivalents thereof.

For example, the resolver of the embodiments is not limited to the two-phase excitation two-phase output type and a part of the resolver signal processing device 100 may be modified and applied to a one-phase excitation two-phase output type or two-phase excitation one-phase output type resolver.

Although the limiter 205 limits the excitation angular frequency compensation value ωex_comp supplied from the adder 211 to a value in a desired range in the above description, instead of this, the limiter 205 may limit the excitation angular frequency ωex to a value in a desired range having the excitation angular frequency ωex as a processing target when the adder 211 is not provided.

REFERENCE SIGNS LIST

1 Drive apparatus
2 Resolver
3 Motor
4 Inverter
100 Resolver signal processing device
101A, 101B Output buffer circuit
102A, 102B DA converter
103A, 103B Transformer
104A, 104B Input buffer circuit
105A, 105B AD converter
106A, 106B Transformer
200 Resolver signal processing unit
201 Deviation calculation unit
202A, 202B Multiplier
203 Subtractor
204 PI controller (PI operation unit)
205 Limiter
206 Integrator (integration operation unit)
207 Conversion processing unit
208 Conversion processing unit
209 Difference processing unit
210 Reference signal generation processing unit
211 Adder
215 Excitation phase estimate generation unit

The invention claimed is:
1. A resolver signal processing device comprising:
a resolver signal processing unit;
input buffer circuits configured to:
  receive a two-phase signal from a resolver, and
  supply signals based on the two-phase signal to the resolver signal processing unit; and
output buffer circuits configured to supply, to the resolver, a two-phase excitation signal based on an excitation signal supplied from the resolver signal processing unit,
wherein the resolver signal processing unit is configured to:
  acquire a signal of phase A and a signal of phase B orthogonal to phase A, which are the signals based on the two-phase signal output by the resolver in response the two-phase excitation signal, the signal of phase A and the signal of phase B being amplitude-modulated;
  calculate a deviation between a first product and a second product, the first product being obtained by multiplying the signal of phase A by a cosine value based on a reference phase θref, the second product being obtained by multiplying the signal of phase B by a sine value based on the reference phase θref;
  carry out a proportional integration operation on the basis of the deviation, the proportional integration operation including a proportional operation and a first integration operation and being defined to converge the deviation on zero;
  carry out a second integration operation of integrating a value generated from a result of the proportional integration operation and output a result of the second integration operation as phase information of the resolver;
  output the result of the proportional integration operation with respect to the deviation in a case that the result of the proportional integration operation with respect to the deviation satisfies a predetermined condition;
  output a predetermined limiting value instead of a sum of the proportional operation and the first integration operation in a case that the sum of the proportional operation and the first integration operation does not satisfy the predetermined condition;

convert the result of the second integration operation or the predetermined limiting value into the excitation signal; and integrate the predetermined limiting value instead of the result of the proportional integration operation with respect to the deviation in a case that the result of the proportional integration operation with respect to the deviation does not satisfy the predetermined condition.

2. The resolver signal processing device according to claim 1, wherein a case that the result of the proportional integration operation with respect to the deviation satisfies the predetermined condition is a case that the result of the proportional integration operation with respect to the deviation is equal to or less than the predetermined limiting value.

3. The resolver signal processing device according to claim 1, wherein the result of the proportional integration operation with respect to the deviation has a dimension of frequency.

4. The resolver signal processing device according to claim 1, wherein the predetermined limiting value is defined within a range in which the phase information does not exceed a tolerance of a circuit of the resolver signal processing unit.

5. The resolver signal processing device according to claim 1, wherein the resolver performs a 2-phase excitation 2-phase output.

6. The resolver signal processing device according to claim 1, wherein the resolver signal processing unit is configured to output a sum of results of the proportional operation and the first integration operation with respect to the deviation as the result of the proportional integration operation.

7. The resolver signal processing device according to claim 1, wherein the resolver signal processing unit is configured to acquire the signal of phase A as sin θ0, acquire the signal of phase B as cos θ0, and calculate the deviation on the basis of sin(θref−θ0).

8. A drive apparatus comprising:
a motor;
a resolver configured to detect rotation of the motor;
the resolver signal processing device according to claim 1, the resolver signal processing device being configured to generate an estimate of a phase of the motor on the basis of the rotation of the motor detected by the resolver; and
an inverter configured to drive the motor on the basis of the estimate of the phase of the motor generated by the resolver signal processing device.

9. A resolver signal processing method, using a resolver signal processing device, comprising:
using input buffer circuits to receive a two-phase signal from a resolver and to supply signals based on the two-phase signal to a resolver signal processing unit;
acquiring, by the resolver signal processing unit, a signal of phase A and a signal of phase B orthogonal to phase A, which are the signals based on the two-phase signal output by the resolver in response to a two-phase excitation signal, the signal of phase A and the signal of phase B being amplitude-modulated;
calculating, by the resolver signal processing unit, a deviation between a first product and a second product, the first product being obtained by multiplying the signal of phase A by a cosine value based on a reference phase θref, the second product being obtained by multiplying the signal of phase B by a sine value based on the reference phase θref;

carrying out, by the resolver signal processing unit, a proportional integration operation on the basis of the deviation, the proportional integration operation including a proportional operation and a first integration operation and being defined to converge the deviation on zero;
carrying out, by the resolver signal processing unit, a second integration operation of integrating a value generated from a result of the proportional integration operation and outputting a result of the second integration operation as phase information of the resolver;
outputting, by the resolver signal processing unit, the result of the proportional integration operation with respect to the deviation in a case that the result of the proportional integration operation with respect to the deviation satisfies a predetermined condition from a limiter;
outputting, by the resolver signal processing unit, a predetermined limiting value instead of a sum of the proportional operation and the first integration operation in a case that the sum of the proportional operation and the first integration operation does not satisfy the predetermined condition from the limiter;
converting, by the resolver signal processing unit, the result of the second integration operation or the predetermined limiting value into an excitation signal;
using output buffer circuits to supply, to the resolver, the two-phase excitation signal based upon the excitation signal supplied from the resolver signal processing unit,
wherein the carrying out the second integration operation comprises integrating the predetermined limiting value instead of the result of the proportional integration operation with respect to the deviation in a case that the result of the proportional integration operation with respect to the deviation does not satisfy the predetermined condition.

10. A non-transitory computer readable medium storing a program for causing a computer of a resolver signal processing device to execute:
acquiring a signal of phase A and a signal of phase B orthogonal to phase A, from input buffer circuits configured to receive a two-phase signal from a resolver and to supply signals based on the two-phase signal to the computer, which are the signals based on the two-phase signal output by the resolver in response to a two-phase excitation signal, the signal of phase A and the signal of phase B being amplitude-modulated;
calculating a deviation between a first product and a second product, the first product being obtained by multiplying the signal of phase A by a cosine value based on a reference phase θref, the second product being obtained by multiplying the signal of phase B by a sine value based on the reference phase θref;
carrying out a proportional integration operation on the basis of the deviation, the proportional integration operation including a proportional operation and a first integration operation and being defined to converge the deviation on zero;
carrying out a second integration operation of integrating a value generated from a result of the proportional integration operation and outputting a result of the second integration operation as phase information of the resolver;
outputting the result of the proportional integration operation with respect to the deviation in a case that the result of the proportional integration operation with respect to the deviation satisfies a predetermined condition from a limiter;

outputting a predetermined limiting value instead of a sum of the proportional operation and the first integration operation in a case that the sum of the proportional operation and the first integration operation does not satisfy the predetermined condition from the limiter;

converting the result of the second integration operation or the predetermined limiting value into an excitation signal;

supplying the excitation signal to output buffer circuits configured to supply, to the resolver, the two-phase excitation signal based upon the excitation signal; and integrating the predetermined limiting value instead of the result of the proportional integration operation with respect to the deviation in a case that the result of the proportional integration operation with respect to the deviation does not satisfy the predetermined condition, in the carrying out a second integration operation.

* * * * *